Patented Jan. 2, 1945

2,366,241

UNITED STATES PATENT OFFICE 2,366,241

TEXTILE PROCESS

Camille Dreyfus, New York, N. Y.

No Drawing. Application November 12, 1941,
Serial No. 418,841

6 Claims. (Cl. 8—60)

This invention relates to the treatment of materials, and relates more particularly to the treatment of materials having a basis of cellulose acetate or other organic ester of cellulose to improve their dyeing characteristics.

An object of my invention is to treat materials such as filaments, yarns, threads, ribbons, fabrics, films, foils, etc., having a basis of cellulose acetate or other organic ester of cellulose, so as to enhance the affinity of said materials for cellulose ester dyestuffs.

Another object of my invention is to treat materials having a basis of an organic ester of cellulose to improve their resistance to acid fading after said materials have been dyed.

Other objects of my invention will appear from the following detailed description.

While my invention will be particularly described in connection with the use of cellulose acetate, the cellulose ester most extensively employed commercially, other organic esters of cellulose may likewise be treated in accordance with my invention and advantageous results may be obtained. Examples of other esters of cellulose are cellulose propionate, cellulose butyrate, and mixed esters such as cellulose acetate-propionate and cellulose acetate-butyrate.

The satisfactory dyeing of textile materials having a basis of cellulose acetate or other organic ester of cellulose has long been a challenge to the skill and ingenuity of those engaged in the art. To a large extent this challenge has been met by the development of not only new and hitherto unknown classes of dyestuffs but also of novel methods for the application of said dyestuffs as well as the known dyestuffs to said textile materials. While the affinity of many dyestuffs for these materials has proven to be satisfactory in some instances, it has been found that although many of the dyestuffs possess the desired substantive affinity for cellulose acetate materials, the time necessary for them to reach the desired depth of shade from a given dye bath is often too great to be economical from a commercial point of view. This disadvantage is especially apparent when dyeing yarns, and fabrics woven of yarns, of high denier having a high filament count. Such yarns are far less opaque than yarns of equal denier but having a lower filament count and are therefore more difficult to dye. As a result, the dyeing of these materials in heavier shades has required not only lengthy immersion but has also required much handling and manipulation of materials, thus hindering the maintenance of an economic production level for the apparatus which is used in the processing of said textile materials. In addition, the textile materials when dyed with many of these dyestuffs have a tendency to fade when exposed to an acid atmosphere, which fading causes undesirable color changes in the materials.

I have now discovered that if materials, having a basis of cellulose acetate or other organic ester of cellulose, are subjected in the absence of tension to treatment for a relatively short period of time with concentrated aqueous solutions of agents having an alkaline reaction, the affinity of said materials for cellulose ester dyes may be considerably increased and the resistance of said materials to acid fading after being dyed may be notably improved. This result is surprising since it is well known in the art that even a treatment with dilute solutions of such agents tends to affect the affinity of said materials for cellulose ester dyes adversely, and often to such an extent that the affinity for such dyes is wholly destroyed.

The agents employed for treating the organic ester of cellulose materials may be, for example, concentrated solutions of inorganic agents such as sodium hydroxide, potassium hydroxide, barium hydroxide, sodium silicate and tri-sodium phosphate, and organic agents such as methylamine, ethylamine, dimethylamine, diethylamine, propylamine, ethanolamine and triethanolamine. Most of these agents may be employed in concentrations varying from 23 to 40% by weight. Preferably, I employ solutions of said compounds of a concentration of from 28 to 38% by weight. The time of treatment of said textile materials will, of course, vary with the concentration of the solution employed and the temperature at which it is maintained during treatment, but is preferably short. Generally, I have found that subjecting the materials to the action of solutions for such short periods from 30 to 120 seconds and maintaining the solutions during treatment at temperatures of from 20° C. to 30° C. yields very desirable results. However, good results are obtained using a 10% solution of barium hydroxide on the materials for 60 seconds maintained at a temperature of 50° C., and a 75% solution of triethanolamine at 85 to 90° C. for 60 seconds.

While any of the above mentioned solutions may be employed for treating the materials, especially desirable results have been obtained when treating materials having a basis of cellulose acetate, for example, by employing aqueous solutions of sodium hydroxide in concentrations of from 23 to 38% by weight. The higher concentrations, i. e. about 33 to 38%, are preferable. By regulating the conditions of treatment so that the temperature of the solution is maintained at from 20° C. to 30° C. and the time of immersion held to from 30 to 120 seconds, but preferably about 30 to 60 seconds, the resultiing effect may be closely controlled. In the case of said cellulose acetate materials, the acetyl value is lowered only slightly and this drop is preferably limited to not more than from 3.0 to 7.0% below its original value (calculated as acetic acid). While this treatment improves the dyeing characteristics of cellulose acetate yarns of any denier, the treatment is most advantageous when dyeing yarns which are normally dyed to deep shades only with difficulty, that is yarns of high denier which have a high filament count. Such yarns are those having a denier of from about 150 to 600 and a filament count of from 40 to 160.

In order to control the action of the solution on the materials, said materials are subjected to a wash with water after the desired period of treatment. This treatment serves to remove the active solution and thus to halt any further action on the material. When a base such as an alkali metalhydroxide is employed, the base still remaining in the material may then be neutralized by washing the material in a dilute solution of acetic or hydrochloric acid and the remaining acid removed by again washing with water.

The solutions may be applied to the materials in various ways. When in the form of a fabric or ribbon or like form, the solution may be applied by dipping, spraying, padding or other convenient method of application. When treating yarns I have found that satisfactory results may be obtained by treating the yarns when loosely wound on bobbins or in hank or other form, or by running the yarn through a series of baths in the course of which it is subjected to the action of the desired solution, the latter removed and/or neutralized and the yarn finally washed. This continuous treatment may likewise be applied to fabrics, ribbons, films, foils, etc.

In order further to illustrate my invention, but without being limited thereto, the following examples are given:

Example I

A fabric woven in a sharkskin weave of cellulose acetate yarns of 300 denier and 80 filaments in the warp and of 600 denier and 160 filaments in the filling, said yarns having an acetyl value of 53.2%, calculated as acetic acid, is subjected for 30 seconds, while free of tension, to the action of a solution of 500 parts by weight of sodium hydroxide in 1,000 parts by weight of water, the solution being maintained at a temperature of 25° C. The treated fabric is then immediately washed with water, after which, the sodium hydroxide remaining in the fabric is neutralized by working the fabric in an aqueous solution containing 10 cc. of acetic acid per liter. The fabric is then washed thoroughly with water and dried. The acetyl value of this cellulose acetate comprising this fabric is lowered to 50.7 by the treatment.

The treated fabric, as well as untreated fabric, is then dyed to a blue shade in a bath comprising:

| | Parts by weight |
|---|---|
| Celliton Blue AF (the probable formula of which is 1 - methylamino - 2 - carboxyamide-4-isopropylamino-anthraquinone) | 2 |
| Wetting or scouring agent | 0.3 |
| Water | 1,000 |

The fabric is dyed at 80° C. for 30 minutes.

When dyed samples of the treated and untreated fabric are subjected to a 16 hour acid fading test by exposing the dyed fabrics to an acid atmosphere, the dyed fabric which had previously been treated with sodium hydroxide shows no change in shade, while the color of the untreated fabric has reddened appreciably. When samples are exposed for 40 hours the color of the treated fabric likewise shows no change while the color of the untreated fabric has reddened considerably.

Example II

A fabric woven of cellulose acetate yarns of 600 denier and 160 filaments in both the warp and the filling is subjected for 60 seconds, while free of tension, to the action of a solution of 600 parts by weight of potassium hydroxide in 1,000 parts by weight of water, the solution being maintained at 28° C. The treated fabric is washed thoroughly with water to remove the base and the fabric then neutralized with a dilute acetic acid solution, washed again, and dried.

The treated fabric, as well as untreated fabric, is dyed to a blue shade in a dye bath comprising:

| | Parts by weight |
|---|---|
| Anthraquinone blue dyestuff | 2 |
| Wetting or scouring agent | 0.3 |
| Water | 1,000 |

The fabric is dyed for 30 minutes at 80° C.

When treated and untreated samples of the dyed fabric are subjected to an acid fading test, the treated dyed fabric shows no change in color while the untreated fabric exhibits an appreciable change from the original blue.

It is to be understood that the foregoing detailed description is merely given by way of illustration and that many variations may be made therein without departing from the spirit of my invention.

Having described my invention, what I desire to secure by Letters Patent is:

1. In a process for the coloration of materials having a basis of an organic ester of cellulose with water-insoluble dyestuffs having an affinity for said materials when applied from an aqueous dispersion, increasing the affinity of said dyestuffs for said materials and improving the resistance to acid fading of said colored materials by subjecting said materials to the action of an aqueous solution of an alkali metal hydroxide of a concentration of from 23 to 40% by weight for from 30 to 120 seconds at a temperature of 20 to 30° C., and then washing the treated materials to remove said solution.

2. In a process for the coloration of materials having a basis of cellulose acetate with water-insoluble dyestuffs having an affinity for said materials when applied from an aqueous dispersion, increasing the affinity of said dyestuffs for said materials and improving the resistance to acid fading of said colored materials by subjecting said materials to the action of an aqueous solution of an alkali metal hydroxide of a concentration of from 23 to 40% by weight for from 30 to 120 seconds at a temperature of 20 to 30° C., and then washing the treated materials to remove said solution.

3. In a process for the coloration of materials having a basis of an organic ester of cellulose with water-insoluble dyestuffs having an affinity for said materials when applied from an aqueous dispersion, increasing the affinity of said dyestuffs for said materials and improving the resistance to acid fading of said colored materials by subjecting said materials to the action of an aqueous solution of sodium hydroxide of a concentration of 33 to 38% by weight for from 30 to 120 seconds at a temperature of 20 to 30° C., and then washing the treated materials to remove said solution.

4. In a process for the coloration of materials having a basis of cellulose acetate with water-insoluble dyestuffs having an affinity for said materials when applied from an aqueous dispersion, increasing the affinity of said dyestuffs for said materials and improving the resistance to acid fading of said colored materials by subjecting said materials to the action of an aqueous solution of sodium hydroxide of a concentration of 33 to 38% by weight for from 30 to 120 seconds at a temperature of 20 to 30° C., and then washing the treated materials to remove said solution.

5. In a process for the coloration of yarns having a basis of cellulose acetate of relatively high denier and filament count with water-insoluble dyestuffs having an affinity for cellulose acetate when applied from an aqueous dispersion, increasing the affinity of said dyestuff for said yarn and improving the resistance to acid fading of said colored yarns by subjecting said yarns to the action of an aqueous solution of an alkali metal hydroxide of a concentration of from 23 to 40% by weight for from 30 to 120 seconds at a temperature of 20 to 30° C., and then washing the treated materials to remove said solution.

6. In a process for the coloration of yarns having a basis of cellulose acetate of relatively high denier and filament count with water-insoluble dyestuffs having an affinity for cellulose acetate when applied from an aqueous dispersion, increasing the affinity of said dyestuff for said yarn and improving the resistance to acid fading of said colored yarns by subjecting said yarns to the action of an aqueous solution of sodium hydroxide of a concentration of from 33 to 38% for from 30 to 120 seconds at a temperature of 20 to 30° C., and then washing the treated materials to remove said solution.

CAMILLE DREYFUS.